United States Patent [19]
Allen

[11] Patent Number: 5,392,521
[45] Date of Patent: Feb. 28, 1995

[54] SURVEYOR'S PRISM TARGET

[76] Inventor: Michael P. Allen, 6795 Lookout Dr., Parker, Colo. 80134

[21] Appl. No.: 75,038

[22] Filed: Jun. 10, 1993

[51] Int. Cl.⁶ .................. G02B 5/122; G01C 15/00
[52] U.S. Cl. ................... 33/293; 356/5.01; 359/529; 359/833
[58] Field of Search ............. 33/293, 286, 289, 294; 356/5, 8; 359/515, 529, 530, 833, 834, 876

[56] References Cited

U.S. PATENT DOCUMENTS

| | | |
|---|---|---|
| 3,322,022 | 5/1967 | Wood . |
| 3,442,016 | 5/1969 | Kaye ..................... 33/293 |
| 3,834,789 | 9/1974 | Brudy . |
| 4,311,382 | 1/1982 | Buckley et al. ............ 33/293 |
| 4,343,550 | 8/1982 | Buckley et al. ............ 33/293 |
| 4,413,907 | 11/1983 | Lane ..................... 356/5 |
| 4,470,664 | 9/1984 | Shirasawa ............... 33/293 |
| 4,519,674 | 5/1985 | Buckley et al. ............ 33/293 |
| 4,644,661 | 2/1987 | Bozzolato ............... 33/293 |
| 4,866,849 | 9/1989 | Parra ................... 33/293 |
| 4,875,291 | 10/1989 | Panique et al. ............ 33/293 |
| 4,875,760 | 10/1989 | Youngren et al. .......... 33/293 |
| 4,898,452 | 2/1990 | Kawachi et al. ........... 33/293 |
| 4,970,794 | 11/1990 | Buckley ................. 33/293 |
| 5,113,589 | 5/1992 | Randolph ............... 33/289 |
| 5,231,539 | 7/1993 | McMillen ............... 33/293 |

FOREIGN PATENT DOCUMENTS

| | | |
|---|---|---|
| 3431880A1 | 7/1985 | Germany . |
| 0011308 | 2/1981 | Japan .................... 33/293 |
| WO87/05387 | 9/1987 | WIPO .................... 33/293 |

Primary Examiner—Christopher W. Fulton
Attorney, Agent, or Firm—Pittenger & Smith

[57] ABSTRACT

A surveyor's retro-reflective device, such as a corner cube prism, is striped along the reflective surfaces to provide an internal visual center target. The precise center of the prism is identified by the visual target which allows the prism to be used both for distance measuring purposes as well as visual alignment for the one step setting of surveying points or locations. The corner cube prism has the ridges of the intersecting reflective surfaces on the back of the prism striped or lined either with a stripe having equal thickness or tapered towards the center apex of the prism. The stripes are formed with a highly visible paint, ink, tape, or sheet material. This arrangement produces a highly visible visual center target. The prism target can be mounted in an enclosed case and the case can be rigidly mounted or tiltably mounted on a horizontal axis to tilt the prism in a vertical direction for use in mountainous terrain. A large exterior target and mount can be provided for centrally mounting the prism and case and tilting mounting the exterior target with the prism so that the two can move together. The tilt axis of the exterior target and prism target are aligned to pass along the front face of the target and through a hypothetical forward offset plane within the prism upon which the visual center target appears to lie.

31 Claims, 5 Drawing Sheets

Fig_1

Fig_2

Fig_3

Fig_12

Fig_13A

Fig_13B

Fig_14

SURVEYOR'S PRISM TARGET

FIELD OF THE INVENTION

This invention is directed to an improved prism target for use with an electronic surveying instrument. It is more specifically directed to a combination retro-reflective prism and visual target for use with an electronic distance measuring device and theodolite which are combined in the form of a surveyor's "Total Station".

BACKGROUND OF THE INVENTION

Many years ago surveyors used what is now classified as relatively crude instruments for performing land surveying. As part of this effort the surveyor used a theodolite or transit for determining the horizontal or azimuth angles as well as the vertical or elevation angles. A chain or tape measure was used to perform the actual distance measurement between the theodolite and the point to be established. In addition to this, the surveyor used a telescopic device called a horizontal level and a graduated rod for determining the actual elevation of a point or location in question.

The art of surveying has advanced considerably. A parallel light or energy beam is now used to determine a precise distance measurement. This beam can have an infrared or laser energy source. In conjunction with this beam, a retro-reflective device, such as a corner cube prism is arranged whereby the energy beam is reflected as a parallel colinear beam of energy back to a receiver. Through phase angle measurements and timing circuits the exact distance between the transmitter and reflector can be precisely determined and displayed. This type of electronic instrument has greatly improved the accuracy that is possible by a surveyor in the taking of measurements and the setting of points. Typically, these electronic distance measuring devices are being used to provide range measurements with respect to the remotely located reflecting devices or prisms which may be as far away as two or three thousand feet from the device.

In recent years, the electronic measuring device has been combined with a typical transit/theodolite instrument and level or vertical collimator into a combination instrument now called a "Total Station38 . Well known manufacturers of these instruments include such companies as Hewlett Packard, The Lietz Company and AGA Corporation. The total station normally includes the optical telescope of the theodolite which has a standard magnification of 30 power. In addition to the electronic distance measuring device, the total station includes the ability to visually measure vertical as well as horizontal angles. Thus, this single instrument is able to perform calculations and accomplish all of the functions that are required by the surveyor in performing his services.

Although the total station is capable of performing the necessary functions and provide the required accuracies in measuring both angles and distance, a major problem with this instrument is the retro-reflective device and visual target that are required for the sighting of the instrument as well as the distance measuring function. Up to now, the retro-reflective device used with this instrument has been a corner cube prism, which is mounted or supported on a slender prism pole and held or controlled by the surveyor's associate. Two levelling bubbles mounted on the pole and positioned in intersecting planes are used to aide the associate in holding the prism in a vertical position. One of the problems with this type of prism has been the inability of the surveyor to accurately sight the center of the prism when it is a considerable distance from the total station.

Even though most of the actual distance measurements and point sightings are within eight hundred to one thousand feet of the surveying instrument, it is still difficult to visually sight on such a small object. Because of this, a number of enlarged planar visual targets having various types of sighting indicia or patterns painted or embossed on the face of the target are attached to or positioned to surround the prism to aide the surveyor in sighting the retro-reflective device. In order to be able to properly use the prism it is necessary to position the prism and target perpendicular to the line of sight of the total station and to extrapolate the alignment center of the visual target which essentially causes the surveyor to guess at the exact center of the target which is usually occupied by the prism. This type of target and the fact that the instrument requires the use of the reflective prism creates a number of inaccuracies in the sighting function that is performed by the total station and in turn the work performed by the surveyor.

As a result, an object of the present invention is to provide a combination prism which also performs as a precise center target for both the distance measuring function and the angular sighting function.

Another object of the present invention is to provide an economical retro-reflective device for surveyors which eliminates the necessity for an additional large planar target for surrounding the prism which is quite fragile and which produces inaccuracies in the visual angular measurements.

Another object of the present invention is to provide an exterior sighting target which can be used with the retro-reflective device of this invention which will eliminate the inaccuracies which have been found with the existing exterior sighting targets.

INFORMATION DISCLOSURE STATEMENT

The following information is provided in response to the applicant's duty to disclose all information which is pertinent to the examination of this application. There should be no inference that the applicant has performed a search for prior art relevant to this invention.

The Buckley et al. patent (U.S. Pat. No. 4,519,674) discloses a retro-reflective prism assembly for use with electronic distance measuring instruments. The structure disclosed in this patent permits tilting and plunging the assembly without requiring a separate tiltable bracket. Visual target indicia are applied to both the front and back surfaces of the dust cover to provide a visual target device which may be secured to the face or back of the prism for visual range targeting.

The second Buckley et al. patent (U.S. Pat. No. 4,343,550) discloses a combined sighting visual target and a bracket for holding a retro-reflector type prism for use with electronic distance measuring instruments. The reflective prism and the visual target are positioned one on top of the other at a fixed distance which corresponds to the vertical displacement between the sighting telescope or theodolite and the distance measuring device. The visual target provides target indicia on separate panels with one panel remaining stationary while other panels tilt with the reflective prism. This arrangement permits a predetermined difference in the elevation between the measuring and sighting device and the corresponding targets.

The Panique et al. patent (U.S. Pat. No. 4,875,291) discloses a bracket for pivotally mounting a prism positioned within the middle or central portion of the visual target. The target has a distinctive indicia. The indicia does not extend into the prism area and therefore it is necessary when visually sighting the target to extrapolate the lines from the indicia across the face of the prism in order to sight the center of the target.

The Kawachi et al. patent (U.S. Pat. No. 4,898,452) describes a visual target plate which can be quickly coupled or mounted on a support for a retro-reflective prism. Again, the visual marking or indicia on the plate must be extrapolated to identify the center of the target for the visual ranging process.

The third Buckley et al. patent (U.S. Pat. No. 4,311,382) is similar to the second Buckley patent in that it provides a support bracket arrangement for mounting one or more reflective prisms on top of a tiltable visual sighting target.

The fourth Buckley patent (U.S. Pat. No. 4,970,794) discloses an improved reflecting prism mounting assembly and a visual sighting target. The visual sighting target provides a support for the prism assembly in addition to its normal function of providing a visual target for long distance sighting and ranging. A diamond shaped sighting target is provided, but still the center point must be extrapolated across the prism in order to provide the center point for sighting purposes.

The Shirasawa patent (U.S. Pat. No. 4,470,664) shows a mounting frame for a reflective prism. The mounting frame has multiple mounting locations for the prism which have different reference surfaces so that the offset value of various prisms can be adjusted as required.

The Bozzolato patent (U.S. Pat. No. 4,644,661) and the Lane patent (U.S. Pat. No. 4,413,907) disclose various brackets and mounting arrangements for retro-reflective devices used in surveying which also provides assistance in the visual alignment and sighting of the target. The Lane patent discloses a remotely controlled reflective device which can be used for sighting various points to determine location and distance.

The Wood patent (U.S. Pat. No. 3,322,022), Brudy patent (U.S. Pat. No. 3,834,789) and Youngren et al. patent (U.S. Pat. No. 4,875,760) disclose retro-reflective prism assemblies wherein the reflecting surface is visual throughout 360 degrees. These devices are used with electronic distance measuring devices to receive and reflect the infrared or laser beams or the like for measuring distances between the reflecting assembly and the instrument. The reflecting surfaces, such as a plurality of prisms are dispersed horizontally 60 degrees so that a number of sightings can be made by the instrument on the same reflector assembly without having to move or adjust the reflector assembly. The Youngren et al. patent also discloses the inclusion of a number of prisms elevated in an upward and downward direction and arranged 360 degrees horizontally to provide multiple sightings from either a higher or lower elevational position.

SUMMARY OF THE INVENTION

This invention is directed to a combination device which will not only provide the retro-reflective characteristics which are required for an electronic distance measuring device but will also provide precise visual center sightings which are required for use with present day surveying instruments. The instrument of choice today by surveyors is a combination instrument which combines both the electronic distance measuring instrument along with the visual telescopic sighting instruments, commonly called a theodolite or transient and level. This instrument is called a "Total Station". For this instrument to function, it is necessary to use a retro-reflective device, such as a corner cube prism and a visual sighting target remotely positioned at the desired location or over a reference point.

In the present invention a new and novel combination reflective prism and visual sighting target is provided. The conventional corner cube type prism used in surveying operations is typically a two and three quarter inch circular glass cylinder with one end of the cylinder truncated in three equal angular reflective surfaces which are normal or perpendicular to each other and which meet together at the rear of the prism in a center apex. The prism can be mounted within a cylindrical case or housing formed from a suitable material, such as a high impact plastic wherein the case forms a sleeve for supporting and retaining the cylindrical prism. The case is usually arranged to be sealed to prevent moisture or dirt from contaminating the reflective surfaces of the prism. Because these surfaces are protected there is no need to coat the reflective surfaces.

The intersecting edges or ridges formed between the truncated reflective surfaces of the prism are coated with a narrow thin stripe, such as ⅛th to 3/16th inch wide, along the entire length of each intersecting edge. The stripe is formed from a high visibility fluorescent or neon paint, ink or coating with the edges of the stripe being parallel to the intersecting lines of the surfaces. In the alternative, the line can taper from the outer edge where it can be as wide as ⅛th to 3/16 inch on each side of the ridge tapering to a width of approximately 1/16th of an inch on each side of the ridge at or near the apex. Although any number of ridges can be painted, usually all of the ridges are painted in order to form an intersecting reticle when viewing the prism through the front face.

Each painted ridge forms a highly visible radial line internally within the prism. Each ridge forms a primary line and a secondary reflected line which is 180 degrees opposite. Thus, if all of the three ridges are painted, a total of six lines intersecting at the exact center of the prism face will be provided. This highly visible prism target which identifies the exact center of the prism is easily visible through the front face from as far away as 1000 feet.

This invention provides a novel and unobvious combination prism target which can be used with a total station to provide a number of simultaneous functions. When used with the total station the remotely located prism can be visibly sighted at a considerable distance to provide both elevation and azimuth angles. At the same time, it can be used to provide the exact distance measurement for determining the precise location of the prism target from the total instrument. Thus, through the use of the combination prism target there is no need for attaching an external visual target which cannot provide the exact center aiming point of the target that is easily provided by the combination prism target as described in this application. It is estimated that the efficiency of the surveyor through the use of the present invention can be improved by as much as 300% over the use of the equipment and procedures that exist in the industry.

Through the inherent characteristics of the visual prism target provided by the striped ridges incorporated in this invention, the internal target allows the prism center to be adequately viewed at a considerable off-angle deviation of as much as 40 degrees from a line normal to the face of the prism. Although it is better to have the face of the prism positioned normal to the total station for distance measuring purposes the visual accuracy of the prism target is not substantially degraded until the position of the total station is at a considerable angular deviation from the face of the target prism. In this way, the surveyor can continue setting points and measuring angles by moving the total station without having to reposition the remotely located prism target.

Where necessary the prism housing can be tiltably mounted on a mounting bracket so that the prism can be tilted in elevation for the visual use of the prism target in hilly or mountainous territory. If a considerable elevational difference is anticipated between the prism target and the total station, the prism target can be generally tilted to position the face of the prism substantially normal to the total station.

As is commonly known in the industry a retro-reflective prism which is used in surveying usually is a corner cube prism. The energy beam which is transmitted by the total station enters the face of the prism and then is returned directly to the total station. The energy beam appears to reflect from a plane which appears to be to the rear of the apex of the prism a predetermined offset distance. By the same token, when the prism is used as a visual target, as explained herein, the visual target appears to be on a separate hypothetical plane which is parallel to the face of the prism and is forward of the apex of the prism also a predetermined offset distance. In the present invention in order to eliminate problems which occur when the prism and the visual target are tilted, the tilt axis for the prism and the prism case passes directly through the center line of the prism in the forward hypothetical plane. Thus, the mount and bracket used for the tilting of the prism is attached to the center line of the prism support pole which in turn, is aligned with the apex of the prism with the actual tilt mounting axis positioned forward from the center line of the mount the predetermined forward offset distance. In this way, the visual target does not appear to move or change position as the prism and case is tilted up or down.

In order to be able to visually identify and see the prism target at extremely long distances a flat planar external target can also be provided. In the present invention the prism is mounted in an aperture or recess positioned within the center of the target and the outer opposite edges of the target are tiltably mounted on a forward offset extending bracket having a threaded base or mount for attachment to the prism support pole. The front face of the exterior target includes horizontal and vertical alignment indicia for use with the internal prism target for visually sighting the center of the prism target. The prism is positioned within the target so that the front surface of the exterior target coincides with the forward hypothetical offset plane present within the prism. The tilt axis of the target and prism is also aligned with the front surface of the target so that as the target and prism are tilted up or down the target horizontal alignment line will remain stationary during the tilting operation. This is extremely important when using the prism target and the exterior target for surveyor level functions. In this way, the elevation angles which are determined by the total station will be precise and accurate. This type of accuracy is impossible with the present prior art exterior targets.

In another embodiment of the target prism the ridges of the intersecting reflecting surfaces on the rear portion of the prism can be cut to form a flat rectangular surface in between the intersecting reflective surfaces rather than having a sharp ridge line. The striping of the prism can be positioned on the flat surface. The flat surface can have either parallel sides or can be inwardly tapered towards the apex. In this way, the centering lines appear flat rather than folded as is apparent with the striping of the ridge lines. This makes for an even more distinct line for sighting purposes. It is also possible when striping either the flat surface or ridge lines to make the stripe intermittent to form a dotted line pattern.

Throughout this application reference has been made to the striping or coating of the ridges of a retro-reflective prism to provide a combination wherein the prism can be used for distance measurements as well as a visual center sighting target. It is to be understood that this striping can be applied to any type of retro-reflective device which is intended for use by surveyors in conjunction with the electronic distance measuring instrument. In addition, the visual markings which are provided in this invention can be utilized when the retro-reflective device is sighted from a substantial deviation angle from a line normal to the face of the prism.

Other features and advantages of the present invention become apparent in the following detailed description of the invention when it is considered in conjunction with the accompanying drawings.

DETAILED DESCRIPTION OF THE INVENTION

Figure 1:
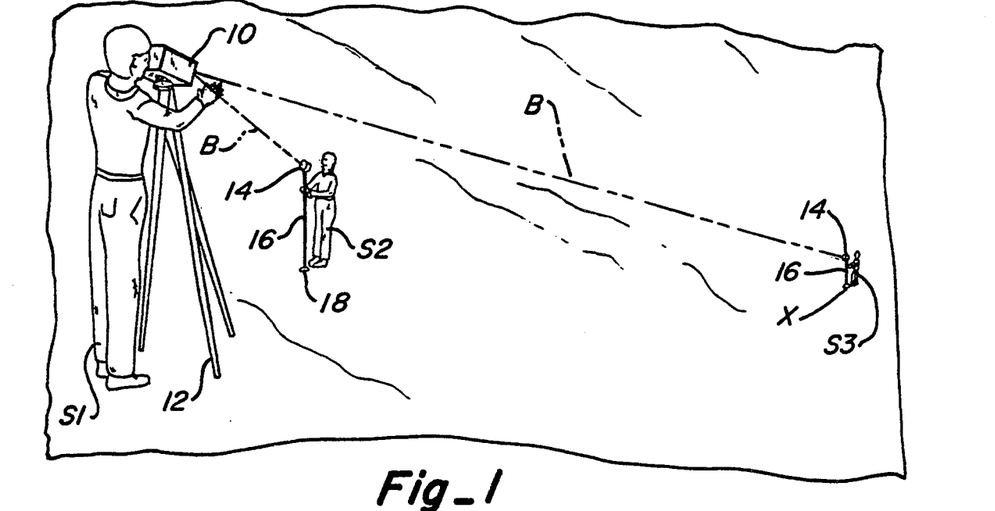
FIG. 1 is a pictorial presentation showing a surveyor setting points at various elevations using the combination prism target as defined in the present invention.

Turning now more specifically to the drawings, FIG. 1 shows a pictorial presentation of a surveyor S1 setting "points" in a hilly or mountainous terrain. A "Total Station" surveying instrument 10 is mounted on a suitable supporting tripod 12. The total station 10 includes an electronic distance measuring device which includes an energy beam transmitter and receiver. The energy beam used in the total station can be either infrared, laser or another type of energy source.

In an operation utilizing the present invention, a surveyor's helper or assistant S2 mounts the prism target 14 according to the present invention on a prism support pole 16 which is of a predetermined length, such as five feet. The bottom end of the pole is positioned on a point of known location and elevation which is commonly called a "benchmark" 18. With the pole 16 held in a vertical position the surveyor S1 sights through the total station 10 to the center of the prism target 14 to establish the location of the total station.

The total station 10 is composed of three major instruments which have been commonly used over the years in the surveying industry. The first instrument is a "theodolite" or "transit-theodolite" with the term sometimes shortened to just "transit". The theodolite portion of the total station includes a high powered telescope, usually 30 power, for sighting and aligning the instrument on a desired remote point. The total station is suitably mounted for rotation around a vertical axis as well as a horizontal axis. It has a 360 degree scale which allows the surveyor to measure various azimuth angles. At the same time, it can pivot up or down to provide readings on a vertical scale for angles of elevation. Through these angles and the use of trigonometry the total station is able to measure angles and perform calculations to identify specific points or to set specific locations. The second instrument which is combined in the total station is a "level" or vertical collimator. The conventional level also has a high powered telescope but it remains fixed in the horizontal plane to provide a means of determining the elevational differences of specific points. The level itself is usually used in conjunction with a graduated scale or stick which is held by an assistant at a specific spot that is to be measured. Actual readings through the level are made on the stick to determine the elevation of the point in question. This stick is no longer required with the present instrument. The third instrument that has been combined is of much more recent vintage and is an electronic distance measuring device. Up to this time surveyors have used a tape measure, usually called a chain, and the actual distance to the point in question was physically measured by use of the chain. This chain is also no longer necessary.

The infrared or laser beam distance measuring device has greatly improved the accuracy of distance measurements in the field. In present day usage the total station uses a thin infrared beam which is generated by a transmitter and focused by visually sighting the total station on a retro-reflective device, such as a corner cube prism to reflect the beam back to the receiving portion of the total station. The beam receiver accepts the beam and determines precisely the total elapsed time for the beam to travel from and to the total station. The time for travel of the reflected beam divided by 2 determines the actual distance between the total station and the reflecting prism. The accuracy of the distance measured is within one thousandth of a foot at distances as great as 1000 feet. Thus, by use of the total station, accuracies within 5 seconds of a degree and one thousandths of a foot are capable when locating and setting specific points during the surveying process.

As seen in FIG. 1, once the specific elevation and location of the total station 10 is established all other points can be located and determined, such as the position X of the surveyor's assistant S3. In this way, various measurements can be taken or on the contrary by knowing the required measurements for setting various points the surveyor S1 through the use of the total station 10 and the prism target 14 can physically spot or set the required points which have previously been identified or determined from plans and drawings or through the help of computers.

The present invention provides a dual purpose retro-reflective device or corner cube prism 14 for use with the total station 10. The applicant has found that greatly increased accuracy and efficiency can be accomplished by combining the visual target for sighting the prism at a substantial distance and the alignment of the prism to perform the required reflecting function.

Figure 2:
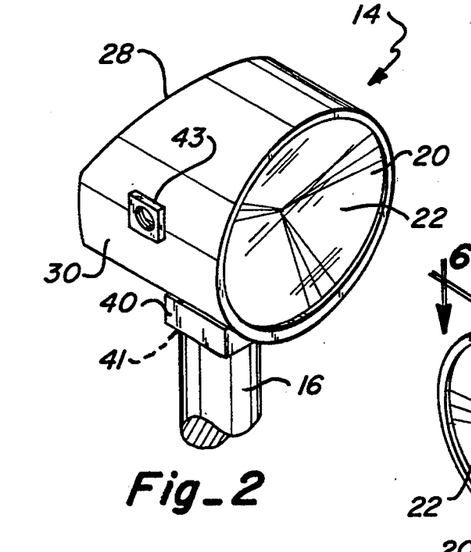
FIG. 2 is a perspective view of the prism target according to the present invention positioned within a housing and mounted on a surveyor's prism pole.

The prism 20 has a cylindrical configuration with a flat front face 22. It is suitably mounted in a case or housing 30 where it is held firmly and is protected from damage. In addition, the case is usually sealed from the environment by a ring 33 to prevent contamination or damage to the reflecting surfaces of the prism. The outer case 30 has a mounting stanchion or base 40 which has a suitable mounting arrangement, such as a threaded aperture or receptacle 41 for mounting and coupling the housing 30 and prism 20 to one end of a suitable surveyor's prism pole 16. The rear end or surface of the case 30 can be bevelled or truncated, if desired, to generally follow the contour of the prism itself. The interior of the case or housing 30 is arranged so that the apex 31 of the reflecting surfaces of the prism 20 is positioned directly over and aligned with the exact centerline axis of the prism pole 16. The significance of this configuration will be discussed in more detail below.

Figure 3:
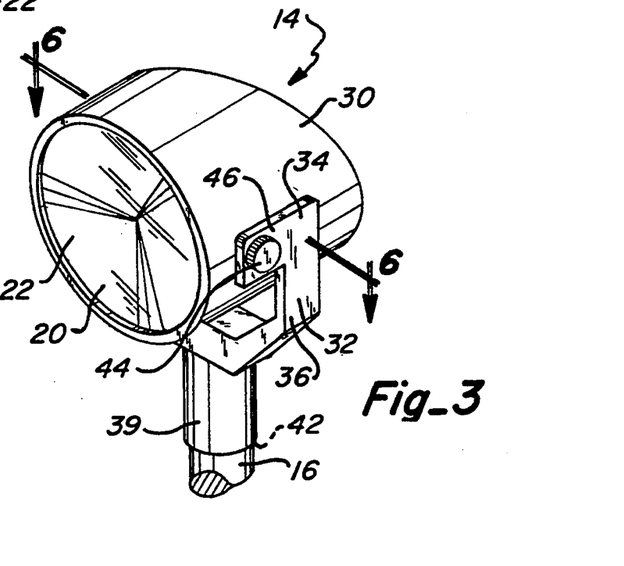
FIG. 3 is a perspective view showing the prism target and housing tiltably mounted on a bracket suitable for attachment to a surveyor's prism pole.
Figures 4, 5, 7, 8, 9:
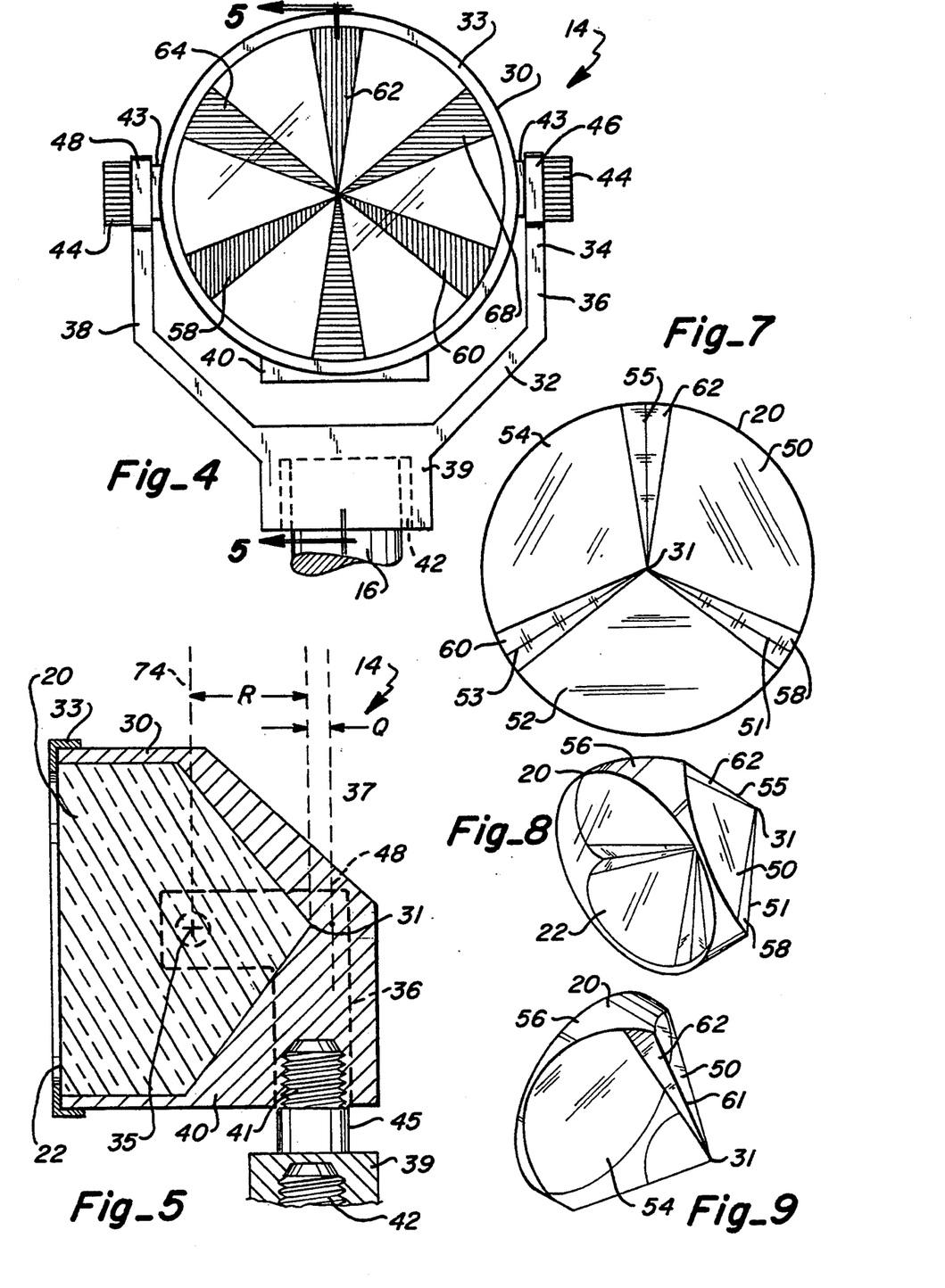
FIG. 4 is a front view of the pivotally mounted prism target.
FIG. 5 is a side cross-sectional view of the prism target taken along lines 5—5 of FIG. 4.
FIG. 7 is a rear view of the prism target according to the present invention.
FIG. 8 is a perspective view of the prism target.
FIG. 9 is a perspective rear view of the prism target showing a flattened surface along the ridges of the prism.
Figure 6:
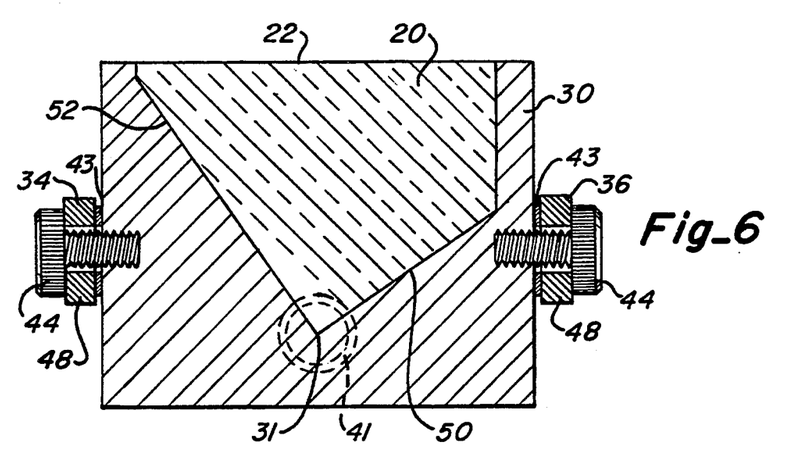
FIG. 6 is a top cross-sectional view taken along lines 6—6 of FIG. 3.

FIGS. 3–5 show another embodiment of the prism housing or case wherein the case 30 with the prism 20 mounted therein is pivotally mounted on a horizontal axis so that the face 22 of the prism can be tilted either upward or downward for sighting by the total station in very hilly or mountainous terrain. The pivotal mount 32 for the case 30 consists of an upright U-shaped bracket 34 having upwardly and forwardly extending arms 36, 38 and a threaded mounting base 39. The mounting base 39 usually includes an internally threaded receptacle 42 which is arranged to accept the conventional threads found on the upper end of the prism pole 16. The width between the arms 36, 38 can be identical to the outside diameter of the case 30. In addition, flat mounting pads or bosses 43 corresponding with the arms 36, 38 can be provided on the sides of the case 30. Knobs 44 having elongated, threaded, center studs can be arranged so that the studs pass through apertures formed in the outer ends of the arms 36, 38 and are arranged so that they are threaded into the sides of the case 30. In this way, the turning of the knobs 44 can tighten the arms 36, 38 against the sides of the case 30 to help in locking the case 30 and prism 20 in the desired tilted position. Additional friction holding accessories can be added and positioned between the arms and the case to more rigidly lock the position of the case. In FIG. 5, the arm 36 is shown to have the forward extending tab or extension 46. By the same token, upwardly extending arm 38 also has a forwardly extending tab or extension 48. The apertures for threadedly securing the knobs 44 are provided near the outer ends of the extensions 46, 48 for tiltably mounting and securing the prism 20 and case 30. This forward extension allows a greater degree of tilt angle for positioning the prism.

FIGS. 7–9 show various views of a corner cube prism which is commonly used in surveying in conjunction with electronic distance measuring equipment. The prism which is commonly used in surveying today is $2\frac{3}{4}''$ in diameter. In most prisms of this type three flat reflective surfaces are formed on the back end of the prism. These surfaces are angled at approximately 45 degrees from the front face 22 of the prism 20 and 90 degrees from each other. The reflective surfaces 50, 52, 54 are formed or cut on the back end of the prism so that each surface extends 120 degrees around the circumference of the barrel 56 of the prism.

These reflective surfaces 50, 52, 54 are smooth planar surfaces which through the reflectivity of the glass surfaces causes the internal light or energy beam received through the face 22 of the prism to be reflected back generally parallel to the incoming beam and normal to the front surface of the face 22. Each one of the reflective surfaces intersects the adjacent reflective surfaces in ridge lines or ridges 51, 53, 55 which are sometimes called roof lines. The ridge lines 51, 53, 55 meet at the center apex 31 on the back end of the prism 20. In the present invention, the reflective surfaces are not coated over the entire outer surface with a reflective coating that is common on mirrors and binocular prisms.

As part of the present invention, a plurality of coatings or stripes 58, 60, 62 can be positioned along the ridges 51, 53, 55 only. These stripes or coatings are usually formed from a highly visible fluorescent ink or paint which is suitably selected for securely adhering to the surface of the glass prism. As shown in FIG. 7, the stripes 58, 60, 62 can be wider at the outer edge and taper to a vanishing point at the apex 31. If desired, the stripes can end approximately 1/16th to ⅛th of an inch from the apex so that an open area at the apex will remain. These stripes or coatings create what is called herein a "prism target".

Since the reflective surfaces 50, 52, 54 of the surveyor's prism are not coated for reflectivity, the stripes 58, 60, 62 are highly visible through the front face 22 of the prism and form a target pattern of double the number of actual stripes formed on the prism. These stripes point precisely to the apex which is at the center of the prism. They form an extremely visible and accurate aiming center for the surveyor when using the total station. Only one or two painted stripes may be used, if desired, but it has been found that by coating all three ridges with fluorescent paint a highly visible internal target is provided in the prism. Although the disclosure up to this point has indicated the use of a fluorescent paint or ink for coating the ridges of the prism, it is possible to use decals, stickers, sheet material 61 or any other device which will stick to and highlight the reflective surfaces to produce the internal target. It is also to be understood that although it has been indicated that the ridges are striped or marked to produce the internal visual target, it is also possible to provide thin or narrow stripes radially along the reflective surfaces themselves to provide a similar indicia display.

In another embodiment, the ridges can be flattened to form a flat plane which is either rectangular or tapered towards the apex 31 of the prism. The flattened plane, in turn, is coated with the visible fluorescent paint or ink or sheet material to highlight the flattened surface and to form the target display. Although a number of variations have been disclosed for creating the internal target display it is to be understood that any type of prism internal target display is considered to be part of the present invention.

In FIG. 4, the target display is seen through the front face 22 of the prism 20. The actual stripes 58, 60, 62 and reflected stripes 64, 66, 68 are visible. This double image is caused by the reflective characteristics of the prism itself. With the use of a fluorescent or neon color paint or ink this type of internal target is highly visible and can be easily seen at distances up to approximately 1000 feet. Most present day construction surveying work is performed within this distance parameter.

Figures 10, 11:
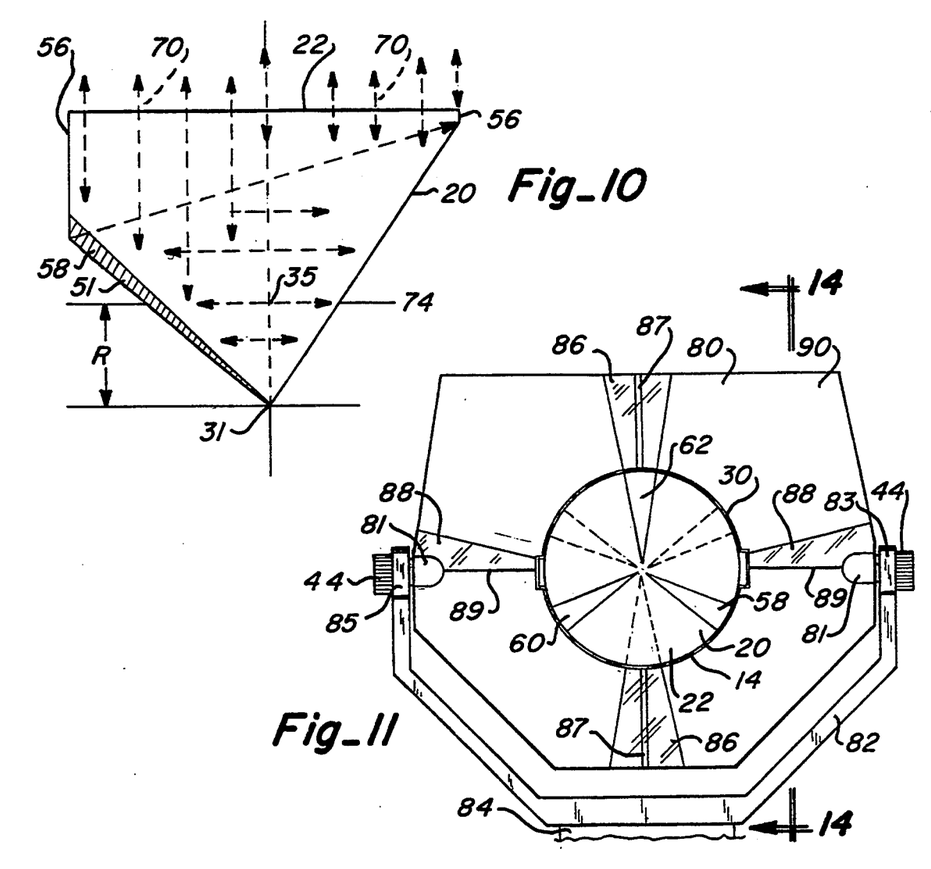
FIG. 10 is a pictorial cross-section view of the prism showing the reflective characteristics of the prism target.
FIG. 11 is a front elevation view showing a tiltably mounted prism target having an enlarged external visual target to supplement the internal target indicia.

FIG. 10 shows a pictorial diagram of the light or energy reflecting characteristics of the corner cube prism. The light or energy rays 70 pass inwardly through the face 22 of the prism 20 and strike a rear reflective surface. Through principals of physics, the energy reflects off the surface at a reflective angle which is equal to the angle of incidence at which it strikes the surface. In a corner cube prism where the reflective surfaces are 90 degrees to each other, the light reflects off the first surface and is then reflected off a second surface to return outward on a line parallel to the incoming energy. In this way the light or energy is returned substantially directly to the source of the energy. This is the principal that is used in the electronic distance measuring circuitry to determine the actual distance between the total station and the target prism.

In actual use, the beam reflective energy from the prism appears to reflect off of a hypothetical plane 37 outside of the prism which is actually offset rearward a specific distance Q from the apex 31 of the prism 20. Thus, to provide actual distance measurements, the offset distance Q must be subtracted from the distance measurement provided by the total station to give the actual total distance. In the typical retro-reflective prism having a diameter of $2\frac{3}{4}$ inches the rear offset distance is 30 mm.

This same prism characteristic also affects the visual target which is provided in the present invention. The visual target appears to lie on a hypothetical or an illusionary plane 74 positioned forward of the apex 31 as represented by the visual forward offset distance R. With a typical retro-reflective prism having a diameter of $2\frac{3}{4}$ inches the forward offset distance appears to be 0.751 inches.

To provide the retro-reflective function which is accomplished by the corner cube prism and to perform the distance measuring function with the infrared or laser beam source it is necessary to substantially position the face 22 of the prism 20 normal to the center line of the incoming energy beam. In this way, the prism will return substantially all of the energy which strikes the face of the prism. With this positioning, the distance measurement is more accurate and reliable. If you position the face at an angle which is greater than 20 degrees from the center line of the energy beam, a substantial amount of the energy is reflected away from the total instrument which degrades the amount of energy received by the instrument and the ability of the instrument to accurately calculate or measure the distance.

This is not true with respect to the visual display provided in the prism target of the present invention. This function of the prism target still allows the center of the prism to be accurately viewed at angles of at least 40 degrees from a line normal to the plane of the face 22. Angles beyond 40 degrees make the sighting questionable as explained later. The angular deviation up to 40 degrees still allows the prism target to be readily visible from a considerable distance without having to reposition the target. However, at times it has been found necessary to actually tilt or turn the prism target when it is being used in mountainous or hilly area. This is especially true when there is a considerable difference in the elevation between the points to be set and the total station.

Figures 13A, 13B:
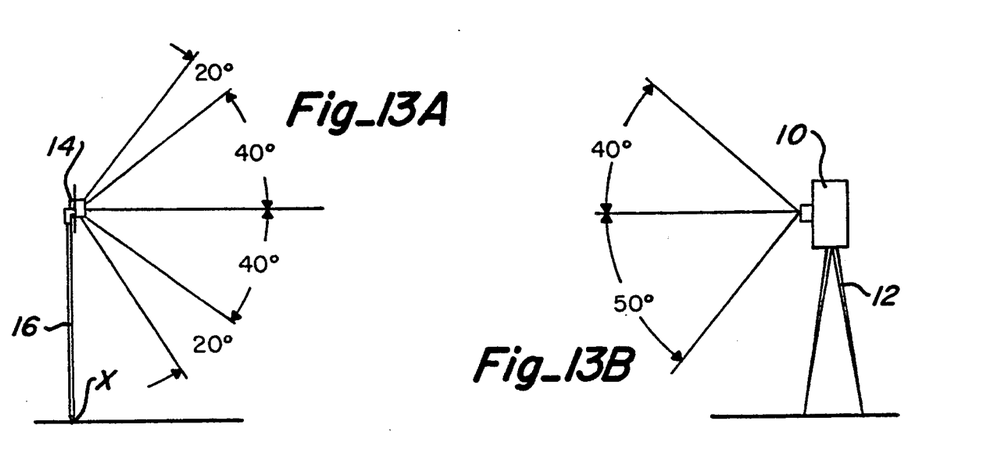
FIGS. 13A and 13B provide a pictorial view of the sighting angular deviation that is possible between the prism target and the total station when utilizing the present invention.

As stated above, the visual observation of the prism target is quite satisfactory up to an angle which is 40 degrees off of a line which is normal to the face 22 of the prism 20. By having the ability to tilt the prism and housing through the pivotal mounts as shown in FIGS. 3-5, an additional tilt angle of as much as 20 degrees can be added to the position of the prism target. Thus, as shown in FIG. 13A, the prism target can be satisfactorily viewed when the difference in vertical elevation either up or down between the prism target and the total station is as much as 40 degrees. FIG. 13B shows the vertical tilt angle capability of the total station which is approximately 40 degrees in an up direction versus 50 degrees in a down direction. Thus, the correlation of the angular movement of the total station 10 is compatible with the angular viewing range of the tiltably mounted prism target 14.

The visual target as provided by the present invention actually appears within the prism 20 to be on the hypothetical offset plane 74 that exists within the prism itself. The tilt axis passes through the center line of the knobs 44 and is aligned through the housing 30 to pass directly through the center of the prism on the hypothetical plane 74. Thus, as can be seen the visual target provided by the present invention appears to lie on the hypothetical offset plane 74 which is positioned within the prism ahead of the apex by the offset distance R. In this way the visual target center provided by the present invention remains constant and does not deviate through the entire elevational tilt angle.

Figure 12:
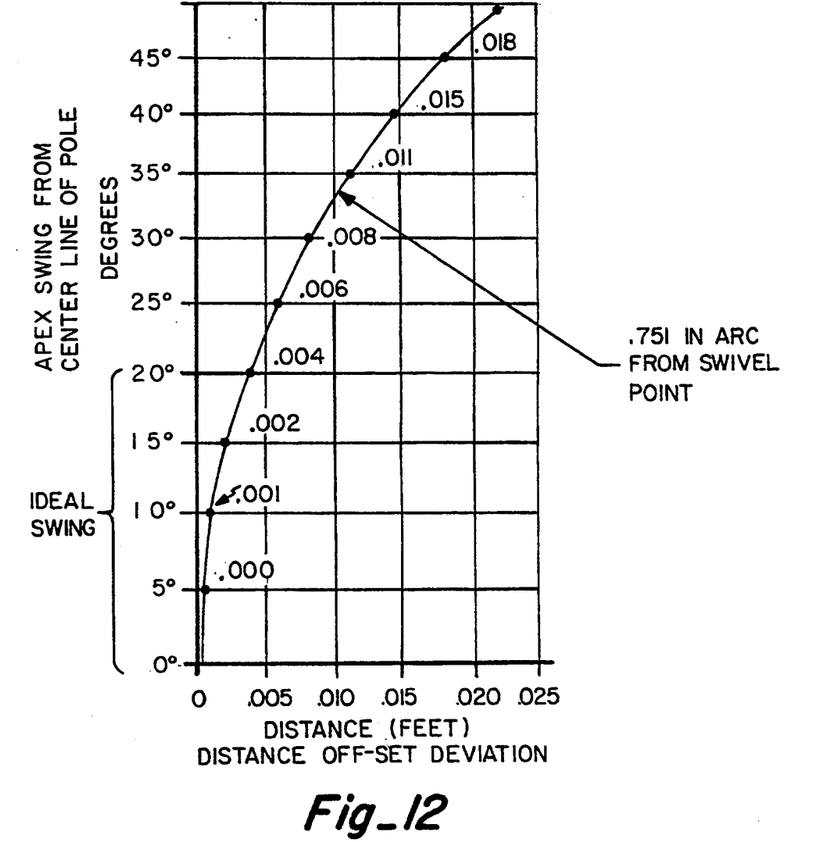
FIG. 12 is a graph showing the change in offset distance of the prism apex from the vertical axis of the support pole with respect to the tilt angle of the prism.

The graph in FIG. 12 represents the movement of the apex 31 of the prism 20 as the prism and housing is tilted about the forward offset horizontal axis. The deviation shown is between the apex and the centerline of the case, mount and prism pole because the tilt axis is offset the distance R ahead of the apex. The degrees along the Y axis represents the tilt angle of the prism from the horizontal. The X axis represents the movement of the apex away from the centerline of the pole.

It is necessary to consider this deviation when actually calculating the distance measured by the total station. As shown in FIG. 12, the total deviation through a 20 degree tilt angle is only 0.004 feet which is within normal tolerances and can be ignored. Beyond 20 degrees the deviation will become more significant and this should be considered. The curve as drawn in FIG. 12 is based on a conventional prism having a forward offset R of 0.751 inches. It is because of this deviation of the apex that the mount may include stops which limit the tilt of the prism and case to a maximum of 20 degrees up or down.

Figure 14:
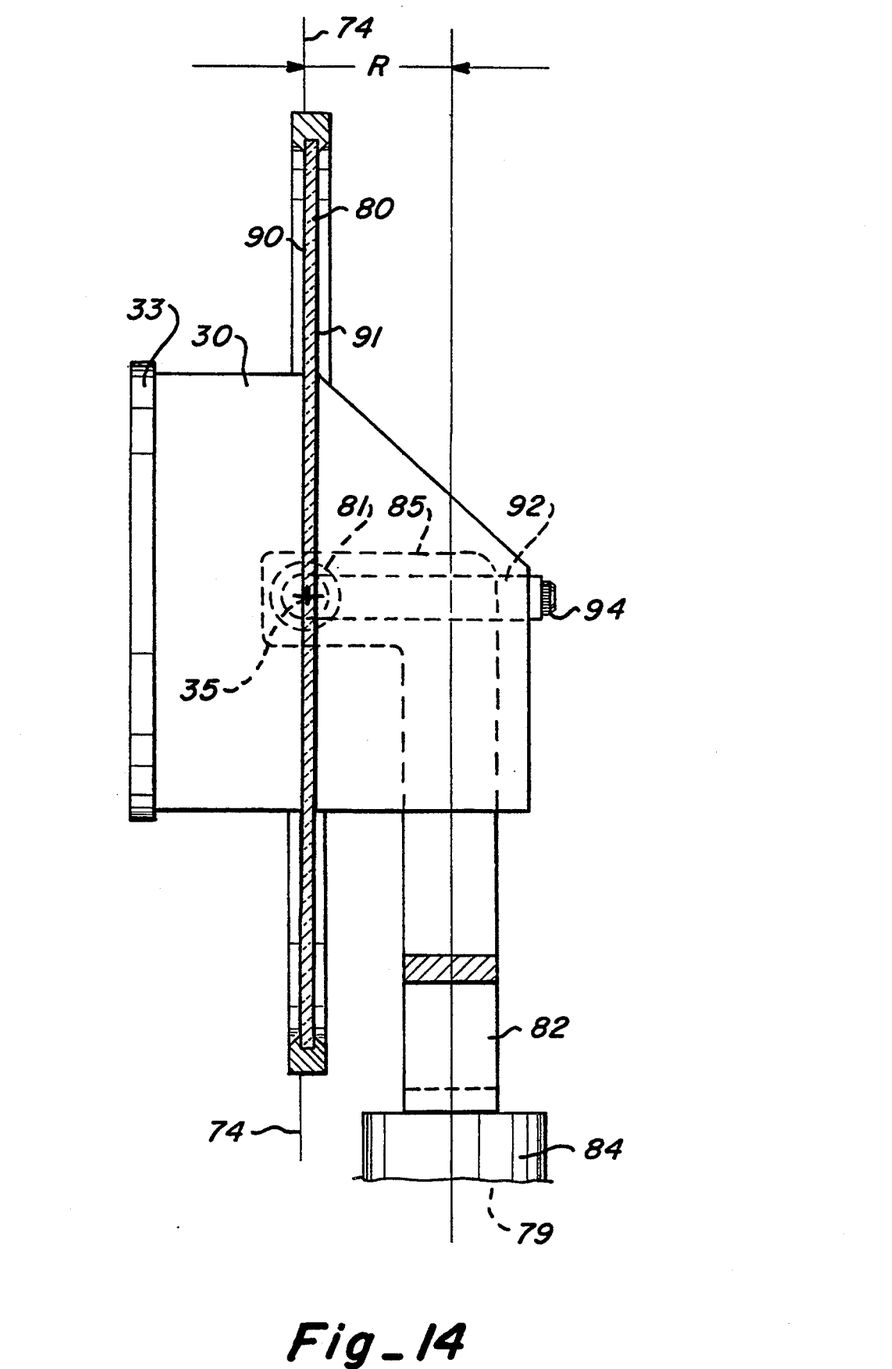
FIG. 14 is a cross sectional view taken along lines 14—14 of FIG. 11 and shows the cross section of the exterior target with relation to the tilt axis.

Turning to FIGS. 11 and 14, the prism target 14, according to the present invention, can be used at distances further than 1000 feet. The problem that is encountered is that a standard diameter prism target is difficult to see beyond that distance. For those situations where visual observation with the total station is difficult at the distances desired, it is possible to increase the diameter of the prism target or include a large sized exterior planar target 80 to provide a mount and support for the prism target 14 including the prism 20 and case 30. The enlarged exterior or external target 80 is tiltably mounted and arranged for attachment to the prism target so that it enhances the visibility of the internal target. The exterior target 80 is attached to the prism target with the threaded attachment holes provided in the prism housing 30 or a receptacle or bracket 92 can be formed in the center of the target for receiving and securing the prism 20 and housing 30. A suitable fastener, such as a bolt 94 can secure the prism housing 30 to the bracket 92. In turn, the flat exterior target 80 has threaded mounting bosses 81 provided on each side into which threaded mounting knobs 44 can be inserted which will allow the target and prism to tilt as a unit on a tilt axis through the mounting bosses 81. A suitably sized mounting bracket 82 and base 84 can be substituted for the previously described bracket and mount. A brightly colored marking indicia 86 and 88 which contrasts with the color of the target surface can be provided on the face of the exterior target 80. If desired, one or more of the target indicia 86, 88 can be aligned with the target stripes 58, 60, 62 of the target prism 14. The only required variation is that the horizontal target indicia 88 must be limited to a horizontal line 89 coinciding with the tilt axis and the horizontal axis of the exterior target which is aligned with the center line of the prism 20. This is done to prevent distortion in the positioning of the exterior target indicia as the exterior target 80 and the prism target 14 are tilted during use in measuring angles of elevation. This helps to alleviate any movement of the exterior target indicia during use which could affect the sighting and alignment of the total station on the prism target 14 during the level functions.

The exterior target 80 has a front or forward surface 90 and a back surface 91 and has a thickness which is sufficient to provide the desired strength and rigidity for surveying field use and especially for level functions. The tilt axis of the exterior target 80 is aligned with the forward hypothetical offset plane 74 in the prism 20. The prism 20 and case 30 is recessed within the center portion of the target so that the hypothetical plane 74 aligns exactly with the front surface 90 of the target 80 and the horizontal sighting line 89. By the same token, the mounting bosses 81 having a threaded receptacle for the threaded stud of the mounting knobs 44 are aligned so that the center line of the threaded holes within the bosses are also aligned with the front surface 90 of the target 80 and the horizontal sighting line 89. The bracket base 84 having the threaded receptacle 79 for the prism support pole 16 has an upwardly extending yoke or bracket 82 which has forward extending arms or extensions 83, 85 which allow the apex of the prism 20 to be aligned over the center line of the prism support pole 16 while at the same time the tilt axis for the target 80 and prism 20 in housing or case 30 is aligned on the forward hypothetical offset plane 74 and through the center line of the prism 20.

The vertical indicia 86 extends vertically beyond both sides of the prism target. A relatively thin line 87 centered within the indicia 86 extends vertically through the center line of the prism. This is a vertical sighting line or a plumb line for measuring azimuth angles.

It is to be understood that while considerable discussion has been provided concerning the target striping and marking of a corner cube reflector this same kind of marking or striping can be provided on other types of similar retro-reflective devices. These could include flat planar mirrors, multi-surfaced reflectors, parabolic mirrors, etc. Thus, any type of surveying device which is utilized for the return reflection of light or energy beams which are used with surveying distance measuring devices, such as a total station, and which can be striped to provide an internal target for precise visual center aiming and alignment during the surveying process is considered part of this invention. This invention further includes any number of stripes or lines on the retro-reflective device which will highlight and identify the target center of the reflective device. This could also include centric circles instead of stripes to accomplish the same result.

While an improved interior visual prism target and exterior target has been shown and described in detail in this application, it is to be understood that this invention is not to be limited to the exact form or structure which has been disclosed and changes in detail and construction of the various embodiments of the invention may be made without departing from the spirit thereof.

What is claimed is:

1. An improved surveyor's target capable of being used by a surveyor for electronic distance measurements and visual alignment for level and plotting functions, the target comprising:
    a) a retro-reflective device for use with a surveyor's angle and distance measuring instrument, said device having a front face surface which is viewed by the surveyor's instrument and an opposite rear end;
    b) said retro-reflective device having a plurality of angled reflective surfaces, said reflective surfaces intersecting each other along ridge lines and all ridge lines come together at a center apex at the rear end of said device, and
    c) a plurality of said reflective surfaces each being coated with a thin stripe whereby the stripes form a visual center target when viewing the retro-reflective device through the front face so as to visually identify the center of the device.

2. An improved surveyor's target as defined in claim 1 wherein the thin stripes are positioned along said ridge lines.

3. An improved surveyor's target as defined in claim 1 wherein the retro-reflective device is mounted within an enclosed case to protect the retro-reflective device from damage and contamination, said case having means for mounting the case on a support means having a longitudinal axis, said retro-reflective device and case being positioned so that the apex of the device is in alignment with the axis of said support means.

4. An improved surveyor's target as defined in claim 1 wherein said retro-reflective device is a corner cube cylindrical prism having said front face surface, an outer cylindrical body surface, and at least three equal angled flat reflective surfaces formed at the rear end opposite said face surface, said ridge lines being formed from the outer body surface to the apex, and said apex being formed at the exact center of the rear end of said reflective device and said stripes are positioned along said ridge lines whereby the stripes form a radial pattern extending outward from said apex to form the center visual target as seen through the front face surface.

5. An improved surveyor's target as defined in claim 4 wherein said ridge lines are coated with a highly visible fluorescent paint.

6. An improved surveyor's target as defined in claim 4 wherein the thin stripe coating of said ridge lines is formed from a highly visible sheet material cut to the size of the stripe and fastened to the ridge lines by a suitable adhesive.

7. An improved surveyor's target as defined in claim 4 wherein the stripe is tapered from a relatively wide dimension on the end of the ridge line away from the apex to a thin dimension near said apex.

8. An improved surveyor's target as defined in claim 1, wherein each of the reflective surfaces are coated with at least one stripe.

9. An improved surveyor's target as defined in claim 1, wherein the thin stripe is formed from a bright color coating which improves the visibility of the center target.

10. An improved prism target for use with a surveyor's total station instrument whereby the surveyor can use the prism target for obtaining distance measurements by reflecting an energy beam and providing an accurate visual target to actually set and locate surveyor's points, said prism target comprising:
    a) a corner cube cylindrical prism having a face surface, an outer cylindrical surface, and three equal area flat reflective surfaces formed at a rear end opposite to the front face surface, said reflective surfaces being arranged 90 degrees to each other and forming a plurality of ridge lines where each of the surfaces intersect with an adjacent surface and all three surfaces meet at a center apex, each of said ridge lines extending from the outer cylindrical surface to the apex, and
    b) a thin stripe is formed on at least two of said ridge lines to form a radial center target when the prism is viewed through the front face surface.

11. An improved prism target as defined in claim 10 wherein said corner cube cylindrical prism is formed from a glass material and said reflective surfaces are uncoated before applying said stripes.

12. An improved prism target as defined in the claim 10 wherein the stripes are arranged to taper from a wide dimension where the ridge line intersects the outer cylindrical surface to a narrow dimension at the apex.

13. An improved prism target as defined in claim 12 wherein the stripes end at a distance no greater than ½ inch from the apex of said prism.

14. An improved prism target as defined in claim 10 wherein the corner cube cylindrical prism is mounted within a sleeve type case to protect the prism from damage and contamination, said case includes a mounting means for attaching the case and said prism to a suitable prism support means having a vertical centerline axis and said prism is positioned within said case so that the apex of the prism is aligned with the axis of said support means when they are attached.

15. An improved prism target as defined in claim 14 wherein said mounting means includes means for tiltably rotating the case and prism around a horizontal axis.

16. An improved prism target as defined in claim 10 wherein the stripes are formed from a highly visible fluorescent paint.

17. An improved prism target for use with a surveyor's total station instrument whereby the surveyor can use the prism target for obtaining distance measurements by reflecting an energy beam and as an accurate visual target to actually set and locate the surveyor's points, said prism target comprising;
   (a) corner cube prism having a face surface, an outer surface, and three equal area flat reflective surfaces formed at a rear end opposite to the front face surface, said reflective surfaces being arranged 90° to each other and forming a plurality of ridge lines where each of the surfaces intersect with an adjacent surface and all three surfaces meet at a center apex, each of said ridge lines extending from the outer surface to the apex,
   (b) a thin stripe is formed on at least two of said ridge lines to form a radial center target when the prism is viewed through the front face surface,
   (c) the corner cube prism is mounted within a case to protect the prism from damage and contamination, said case includes a mounting means for attaching the case and said prism to a suitable prism support means having a vertical center line axis,
   (d) said mounting means includes means for tiltably rotating the case and prism around a horizontal axis, and
   (e) the radial center target appears on a hypothetical plane which is offset forward of the apex of the prism a predetermined offset distance and said horizontal tilt axis passes through said hypothetical plane.

18. An improved prism target as defined in claim 17 wherein the tiltable rotating means includes extension arms extending forward toward the face surface of the prism so that the tilt axis is aligned with the hypothetical plane and the centerline of the mounting means remains aligned with the centerline of the support means.

19. A method of making a prism target which includes a combination visual target and a retro-reflective device so that a surveyor can set and locate a number of points from one set-up location; said method including the steps of:
   a) forming a glass prism having a cylindrical outer surface, a flat face surface formed at one end and a plurality of flat reflective surfaces formed at an opposite rear end;
   b) each of two intersecting reflective surfaces forming a ridge line therebetween and all of said ridge lines intersect at a center apex at the rear end of said prism; and
   c) coating the edge of at least two of the ridge lines with a highly visible material to form thin stripes along said ridge lines so that a visual radial center target appears within the prism when viewed through the flat face surface.

20. A method of making a prism target as described in claim 19 wherein the coating of the ridge line is formed in a tapered pattern which tapers to the apex formed at the rear end of the prism.

21. A method of making a prism target as described in claim 20 which includes the step of mounting the prism target in an enclosed case to support and protect the prism target from contamination of the reflective surfaces.

22. An improved prism target for use with a surveyor's total station instrument whereby the surveyor can use the prism target for obtaining distance measurements by reflecting an energy beam and providing an accurate visual target to actually set and locate surveyor's points, said prism target comprising:
   a) a corner cube cylindrical prism having a face surface, an outer cylindrical surface, and three equal area flat reflective surfaces formed at a rear end opposite to the front face surface, said reflective surfaces being arranged 90 degrees to each other and forming a plurality of ridge lines where each of the surfaces intersect with an adjacent surface and all three surfaces meet at a center apex, each of said ridge lines extending from the outer cylindrical surface to the apex;
   b) a thin stripe is formed on at least two of said ridge lines to form a radial center target when the prism is viewed through the front face surface;
   c) the thin stripes extend from the outer surface to the apex and are formed from highly visible material; and
   d) the prism is mounted within a case having a base means for attaching the case and the prism to a suitable prism support means having a vertical centerline axis and said prism is positioned within said case so that the apex of the prism is aligned with the axis of said support means.

23. An improved prism target as defined in claim 22, wherein said thin stripes are arranged to taper from a relatively wide dimension near the outer surface to a narrow dimension near the apex of the prism to further highlight the center of the visual target.

24. An exterior sighting target for use with a surveyor's retro-reflective prism target, said surveyor's prism target having a front face surface and a plurality of reflective surfaces meeting at a center apex at a rear portion of the prism, the reflective surfaces having a unique coating pattern which produces an internal visual center target which appears to lie on a hypothetical plane parallel to the front face surface and forward of the apex a specific offset distance, said prism being suitably mounted within a case for attachment to a support means, said exterior sighting target surprising:
   a) an enlarged thin planar member having a front surface and an opposite rear surface and an outer perimeter edge;
   b) first mounting means centrally positioned within said thin planar member for retaining and securing the prism and case so that the front face of the prism is parallel with the front surface of the planar member which is arranged to coincide with the hypothetical offset visual target plane of the prism;
   c) means attached to said planar member and having a second mounting means for connecting the planar member to a suitable support means having a vertical centerline axis, said attached means being arranged to position the apex of the prism in alignment with the centerline axis of the support means; and
   d) indicia provided on the front surface of the planar member, said indicia having an appearance which contrasts with the front surface of the exterior target, said indicia having a design which visually aligns with the center of the visual target of the prism.

25. An exterior sighting target as defined in claim 24 wherein the second mounting means includes a threaded receptacle for attaching the exterior sighting target to a prism support pole means.

26. An exterior sighting target as defined in claim 24 wherein said indicia includes horizontal and vertical sighting lines which are aligned with the center of the prism visual target.

27. An exterior sighting target as defined in claim 26 wherein the attached means is an upwardly extending bracket means attached between the second mounting means and the planar member.

28. An exterior sighting target as defined in claim 27 wherein the bracket means has an upwardly extending U-shaped yoke having forwardly extending arms on each side of said yoke which are attached to the opposite perimeter edges of said planar member.

29. An exterior sighting target as defined in claim 27 wherein the bracket arms are pivotally attached on the opposite edges so that the planar member and the mounted prism and case rotate around a horizontal tilt axis, said tilt axis is arranged to correspond with the horizontal sighting line of the indicia whereby as the thin planar target member and the prism target are tilted in the vertical direction so that the horizontal sighting line does not deviate.

30. An exterior sighting target as defined in claim 24 wherein the indicia is a coating of fluorescent material which is arranged in areas which taper towards the center of the planar member and are positioned to substantially correspond with the visual center target provided in the prism target.

31. An exterior sighting target as defined in claim 30 wherein the indicia comprises at least two pairs of areas wherein one pair is aligned on the vertical axis through the front face of the planar member and second pair is aligned on the horizontal axis of said planar member of the horizontal axis indicia area is positioned on one side of and does not go beyond the horizontal axis of the planar member.

* * * * *